US010299159B2

(12) United States Patent
Chen et al.

(10) Patent No.: US 10,299,159 B2
(45) Date of Patent: May 21, 2019

(54) COMMUNICATION SYSTEM

(71) Applicant: NEC Corporation, Minato-ku, Tokyo (JP)

(72) Inventors: Yuhua Chen, London (GB); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/125,914

(22) Filed: Sep. 10, 2018

(65) Prior Publication Data
US 2019/0082349 A1    Mar. 14, 2019

Related U.S. Application Data

(63) Continuation of application No. 15/500,218, filed as application No. PCT/JP2015/003641 on Jul. 21, 2015, now Pat. No. 10,091,684.

(30) Foreign Application Priority Data

Aug. 8, 2014   (GB) .................................. 1414139.4

(51) Int. Cl.
*H04W 28/02* (2009.01)
*H04W 28/12* (2009.01)
(Continued)

(52) U.S. Cl.
CPC ......... *H04W 28/0257* (2013.01); *H04L 47/41* (2013.01); *H04W 28/0236* (2013.01);
(Continued)

(58) Field of Classification Search
CPC ... H04L 5/0046; H04L 5/006; H04L 43/0894; H04L 47/125; H04W 84/12; H04W 4/06;
(Continued)

(56) References Cited

U.S. PATENT DOCUMENTS

2010/0284278 A1    11/2010  Alanara
2011/0116478 A1*   5/2011   Zhang .............. H04W 36/0055
                                                            370/331
(Continued)

FOREIGN PATENT DOCUMENTS

EP         2237604 A2    10/2010
EP         2312795 A1    4/2011
(Continued)

OTHER PUBLICATIONS

3rd Generation Partnershp Project, Technical Specification Group Radio Access Network; Evolved Universal Terrestrial Radio Access (E-UTRA); Study on Small Cell Enhancements for E-UTRA and E-UTRAN—Higher Layer aspects (Release 12), 3GPP TR 36.842 V0.4.2 (Nov. 2013).

(Continued)

*Primary Examiner* — Kwasi Karikari

(57) ABSTRACT

A communication system is disclosed, in which a mobile telephone has a control-plane connection to a first base station and communicates user data using at least one communication bearer provided via a second base station. The base stations are configured to exchange information relating to the data rate required for the mobile telephone via the second base station. The first base station derives, based on the exchanged information, an aggregated maximum bit rate (AMBR) parameter specific to the second base station and provides the derived AMBR parameter to the second base station for use in data rate enforcement for the mobile telephone's communications via the second base station.

12 Claims, 8 Drawing Sheets

(51) Int. Cl.
*H04W 28/22* (2009.01)
*H04W 76/15* (2018.01)
*H04L 12/891* (2013.01)
*H04W 84/04* (2009.01)
*H04W 92/20* (2009.01)
*H04W 28/08* (2009.01)

(52) U.S. Cl.
CPC ....... *H04W 28/0278* (2013.01); *H04W 28/12* (2013.01); *H04W 28/22* (2013.01); *H04W 76/15* (2018.02); *H04W 28/08* (2013.01); *H04W 84/045* (2013.01); *H04W 92/20* (2013.01)

(58) Field of Classification Search
CPC . H04W 28/22; H04W 28/0231; H04W 36/30; H04W 48/18; H04W 72/0453; H04W 28/08; H04W 36/0044; H04W 36/26; H04W 72/1252; H04W 72/14; H04W 74/004; H04W 74/006; H04W 74/0833; H04W 8/005; H04W 28/18; H04W 28/24; H04W 48/00
See application file for complete search history.

(56) References Cited

U.S. PATENT DOCUMENTS

| | | | |
|---|---|---|---|
| 2013/0114408 A1 | 5/2013 | Sastry et al. | |
| 2014/0169299 A1* | 6/2014 | Wang | H04L 5/0096 370/329 |
| 2014/0254476 A1* | 9/2014 | Blankenship | H04L 47/20 370/328 |
| 2015/0264612 A1 | 9/2015 | Baek et al. | |

FOREIGN PATENT DOCUMENTS

| | | |
|---|---|---|
| EP | 2753035 A2 | 7/2014 |
| RU | 2450485 C2 | 5/2012 |
| WO | 2013/104416 A1 | 7/2013 |
| WO | 2014/069918 A1 | 5/2014 |
| WO | 2015/115606 A1 | 8/2015 |

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401 V12.5.0 (Jun. 2014).
3rd Generation Partnershp Project, Technical Specification Group Radio Access Network; Evolved Universal Terrestrial Radio Access (E-UTRAN);S1 Application Protocol (S1AP) (Release 12), 3GPP TS 36.413 V12.2.0 (Jun. 2014).
3rd Generation Partnershp Project; Technical Specification Group Radio Access Network; Evolved Universal Terrestrial Radio Access (E-UTRA) and Evolved Universial Terrestrial Radio Access Network (E-UTRAN);Overall description;Stage 2 (Release 12), 3 GPP TS 36.300 V12.2.0 (Jun. 2014).
Ericcson: "UW-AMBR Allocation in the context of DC scenarios", 3GPP DRAFT: R3-140347, 3rd Generation Partnership Project (3GPP), TSG-RAN WG3 Meeting #83, Prague, Czech Republic; Feb. 10-14, 2014, XP050738786.
International Search Report for PCT Application No. PCT/JP2015/003641, dated Sep. 29, 2015.
Written Opinion of the International Search Authority for PCT Application No. PCT/JP2015/003641.
3GPP TSG-RAN WG3 Meeting #64, R3-141173, "Coordination of UE AMBR in dual connectivity", Agenda item: 20.1.7, Source: Alcatel-Lucent Shanghai Bell, Alcatel-Lucent, Seoul, Korea, May 19-23, 2014, 3 pages.
Japanese Office Action for JP Application No. 2017-525689 dated Dec. 20, 2017 with English Translation.
3rd Generation Partnership Project (3GPP), "Open issue resolution of UE-AMBT", 3GPP TSG-RAN WG3 Meeting #84, May 9-23, 2014, R3-141098, Seoul, Korea.
Korean Office Action for Application No. 10-2017-7004632 dated Jan. 16, 2018 with English Translation.
Russian Office Action for RU Application No. 2017107190/08(012523) dated Mar. 14, 2018 with English Translation.

* cited by examiner

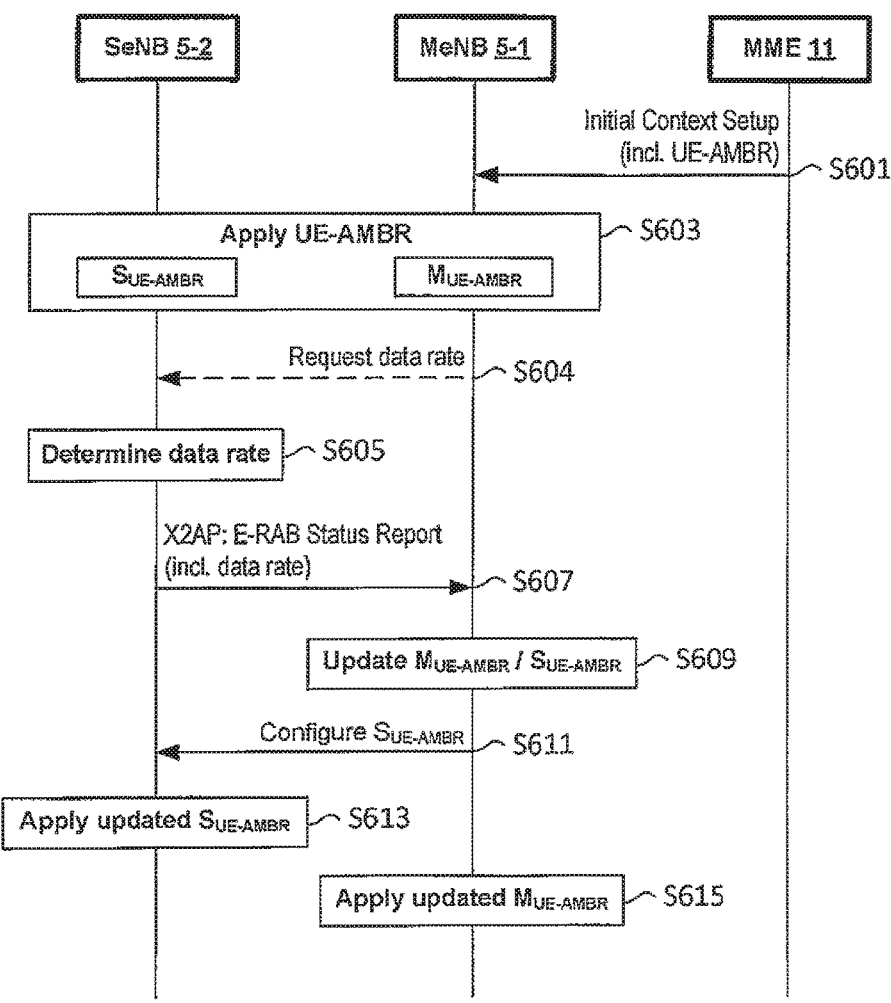
[Fig. 6]

[Fig. 7]
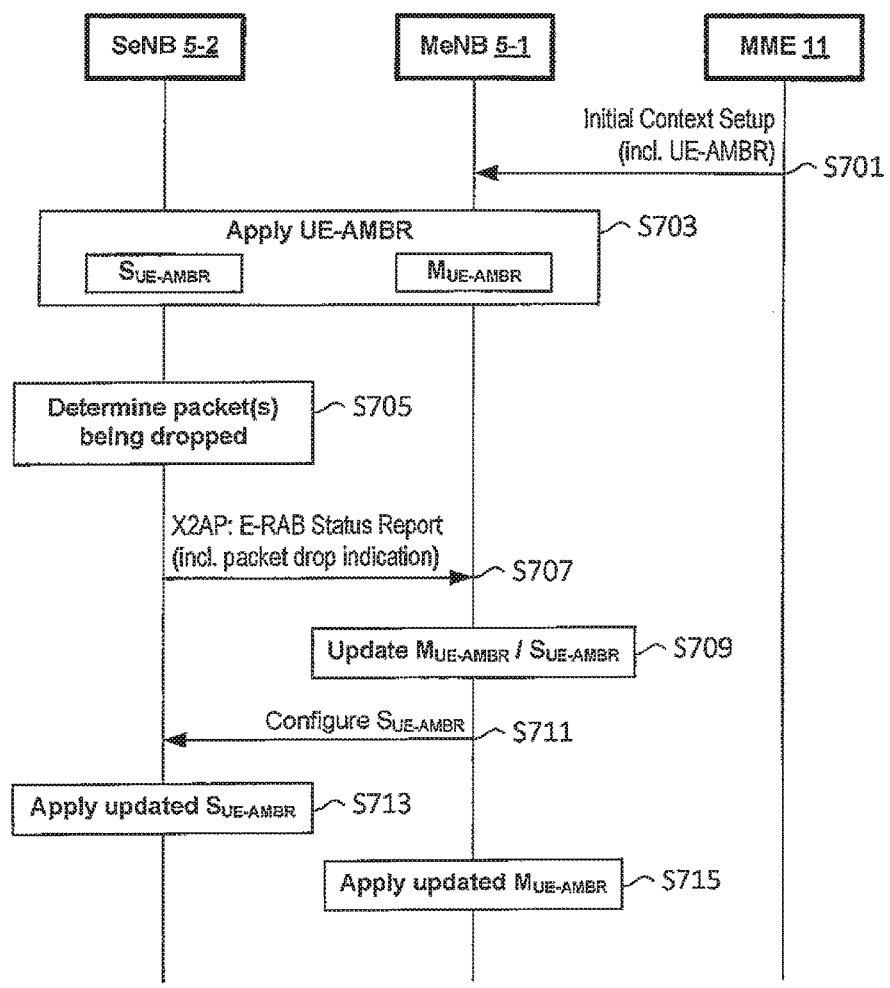

[Fig. 8]
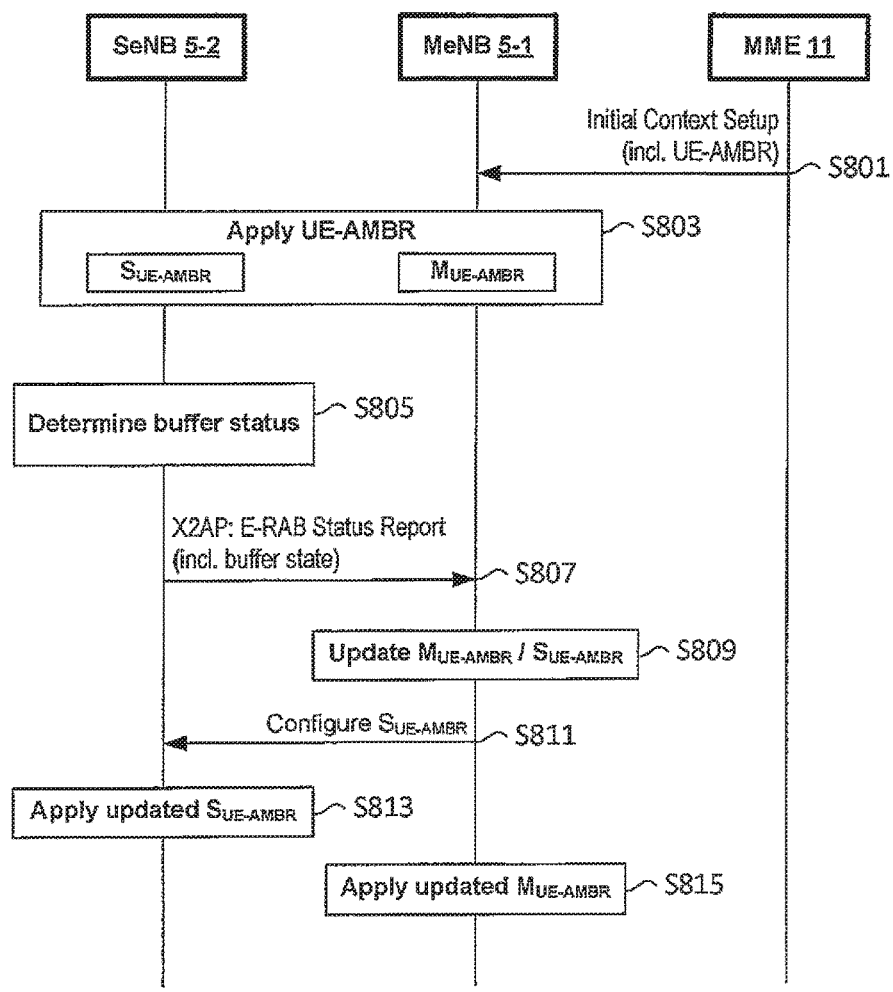

COMMUNICATION SYSTEM

COMMUNICATION SYSTEM

The present application is a continuation application of U.S. patent application Ser. No. 15/500,218 filed on Jan. 30, 2017, which is a National Stage Entry of international application PCT/JP2015/003641, filed Jul. 21, 2015, which claims the benefit of priority from United Kingdom Patent Application 1414139.4 filed on Aug. 8, 2014, the disclosures of all of which are incorporated in their entirety by reference herein.

TECHNICAL FIELD

The present invention relates to a communication system and to components thereof for providing communication services to mobile or fixed communication devices. The invention has particular, but not exclusive, relevance to connectivity via multiple base stations in Long Term Evolution (LTE) Advanced systems as currently defined in associated $3^{rd}$ Generation Partnership Project (3GPP) standards documentation.

BACKGROUND ART

In a cellular communications network, user equipment (UE) (such as mobile telephones, mobile devices, mobile terminals, etc.) can communicate with other user equipment and/or remote servers via base stations. LTE systems include an Evolved Universal Terrestrial Radio Access Network (E-UTRAN) and an Evolved Packet Core (EPC) network (or simply 'core network'). The E-UTRAN includes a number of base stations ('eNBs') for providing both user-plane (e.g. Packet Data Convergence Protocol (PDCP), Radio Link Control (RLC), Medium Access Control (MAC) and PHYsical (PHY) layers) and control-plane (e.g. Radio Resource Control (RRC)) protocol terminations towards the UE.

Recent developments in communication networks have seen increased deployment of so called 'small' cells operated by Low Power Nodes (LPNs), such as pico eNBs, femto eNBs, home eNBs (HeNBs) or the like, which cells have a smaller coverage area than existing macro cells operated by a higher power (regular) macro base station. Networks comprising a number of different cell types, for example a network comprising a macro cell and a femto cell, are referred to as Heterogeneous Networks, or HetNets. In the following description the term base station is used to refer to any such macro base station or LPN. Conventionally, a mobile telephone is configured to communicate via one base station (using an associated radio link). However, in a study on small cell enhancements for E-UTRA and E-UTRAN (3GPP technical report (TR) no. 36.842, the contents of which are incorporated herein by reference), a so-called 'dual connectivity' functionality was introduced to improve, for example, the coverage of high data rates for user equipment, temporary network deployment, cell edge throughput and/or to increase system throughput. The dual connectivity feature established techniques for compatible mobile telephones (and other user equipment) to communicate with multiple network points, substantially simultaneously. Specifically, this 'dual connectivity' functionality refers to an operation mode where a given mobile telephone (operating in RRC_CONNECTED mode) consumes radio resources provided by at least two different network points (e.g. two or more base stations). Typically, one of the network points involved in the dual connectivity functionality is a macro base station and the other network point (or a plurality of network points) comprises a low power node (or plurality of low power nodes).

Each network point (also referred to as 'access point') involved in the provision of dual connectivity for a mobile telephone may assume a different role. One of the network points may be referred to as a master base station (MeNB) and each one of the other network points may be referred to as a secondary base station (SeNB). Typically, the various secondary base stations involved in the provision of dual connectivity are coupled (to the MeNB and hence the core network) via a so-called non-ideal backhaul. Further, in a dual connectivity scenario, one of the base stations (the MeNB) routes control plane signalling to the core network via an associated interface (e.g. the S1 interface), regardless of whether or not the other base station is also connected to the core network for user plane communication (e.g. to a serving gateway).

The MeNB/SeNB roles do not necessarily depend on each base station's capabilities/type (e.g. power class) and may be different for different mobile telephones (even when using the same base stations).

In accordance with the dual connectivity functionality, a mapping between the mobile telephone's radio (communication) bearer(s) and the base stations may be realised as follows:
- a so-called Master Cell Group (MCG) bearer in which a radio bearer is served by the MeNB only (or 'MeNB-specific bearer');
- a so-called Secondary Cell Group (SCG) bearer in which a radio bearer is served by the SeNB only (or 'SeNB-specific bearer'); and
- a split bearer in which a radio bearer is served by the MeNB and the SeNB.

In order to ensure that an appropriate level of service (e.g. a desired data rate) can be provided for each user in the communication network, the network operator assigns various parameters that determine an aggregate maximum bit rate (AMBR) that can be provided to the users (subscribers) in the network per subscriber and per access point. Specifically, for each subscriber, the Home Subscriber Server (HSS) holds an associated 'HSS_APN-AMBR' parameter (per APN) and an 'HSS_UE-AMBR' parameter, forming part of the user's subscription data.

The HSS_APN-AMBR (APN Aggregate Maximum Bit Rate) parameter for a particular (subscriber's) user communication device limits the non-guaranteed aggregate bit rate across all PDN connections by that user communication device via a particular APN. The actual 'APN-AMBR' parameter to be used (enforced) by the given access point (e.g. P-GW) is provided by the MME based on subscription data obtained from the HSS.

The HSS_UE-AMBR (UE Aggregate Maximum Bit Rate) parameter for a particular (subscriber's) user communication device limits the total traffic of that user communication device on uplink and downlink (via the serving base station). The actual 'UE-AMBR' parameter to be used (enforced) by the serving base station is provided by the MME based on subscription data obtained from the HSS. Specifically, the MME computes the UE-AMBR parameter such that it equals the smaller of the sum of all HSS_APN-AMBR parameters of active APNs and the HSS-UE-AMBR parameter. This is further illustrated in the 3GPP TS 23.401 standard, the contents of which are incorporated herein by reference. The MME transmits the calculated UE-AMBR parameter to the serving base station, which base station is thus able to allow/discard data traffic for the user communication device in accordance with the UE-AMBR parameter. This is further illustrated in the 3GPP TS 36.413 and TS 36.300 standards, the contents of which are incorporated herein by reference.

Thus traffic sent/received by a particular user communication device in excess of the bit rate indicated by the UE-AMBR parameter may get discarded by a rate shaping function of the base station serving that user communication device, and traffic exceeding the bit rate indicated by the applicable APN-AMBR parameter may get discarded by a rate shaping function of the corresponding APN. The UE-AMBR parameter and the APN-AMBR parameter are applicable across all non-Guaranteed Bit Rate (non-GBR) bearers of a particular subscriber (i.e. a user communication device associated with that subscriber).

Each base station guarantees a downlink guaranteed bit rate associated with a so-called guaranteed bit rate (GBR) bearer, enforces a downlink maximum bit rate (MBR) associated with a particular GBR bearer and enforces a downlink Aggregate Maximum Bit Rate (AMBR) associated with a group of non-GBR bearers. Further, in the uplink, by limiting the total grant of communication resources to an item of user equipment, the base station can ensure that a UE-AMBR for a respective group of non-GBR bearers associated with each item of user equipment, plus the sum of MBRs is not exceeded.

There is a general consensus that, during dual connectivity, the MeNB should manage the UE-AMBR and provide, to the SeNB, information which assists the SeNB to provide both downlink and uplink AMBR enforcement when the SCG bearer option is applied.

The overall UE-AMBR enforced for a particular dual connectivity UE may be split between an MeNB-specific UE-AMBR ($M_{UE\text{-}AMBR}$) for that UE and an SeNB-specific UE-AMBR ($S_{UE\text{-}AMBR}$) for that UE. The $S_{UE\text{-}AMBR}$ is sent to the SeNB by the MeNB managing the overall UE-AMBR, and the SeNB enforces the $S_{UE\text{-}AMBR}$ accordingly.

However, the inventors have realised that, as a result of non-GBR bearers of a UE potentially being distributed between the MeNB and SeNB during dual connectivity, and contrary to the current consensus, the generally accepted route forward can result in a sub-optimal solution in which, for example, the UE-AMBR is not always split between the master and secondary base stations in the most efficient manner.

For example, when there is a lot of data in SeNB's buffer which is not sent due to enforcement of the $S_{UE\text{-}AMBR}$, and the data rate of data arriving in MeNB is significantly lower than $M_{UE\text{-}AMBR}$, then the actual data rate available to the UE may be significantly lower than the overall UE-AMBR that the UE is entitled to by contract. Similarly, when there is a lot of data in MeNB's buffer which is not sent due to enforcement of the $M_{UE\text{-}AMBR}$, and the data rate of data arriving in SeNB is significantly lower than $S_{UE\text{-}AMBR}$, then the actual data rate available to the UE may be significantly lower than the overall UE-AMBR that the UE is entitled to by contract. Thus, the UE may suffer data loss due to UE-AMBR enforcement unnecessarily.

To help illustrate this issue, a number of examples of unnecessary data loss are summarises below:

Downlink—Unnecessary Packet Dropping in SeNB:

For a particular UE, the value of UE-AMBR may be e.g. 10 Mbps for distribution between the two radio bearers used by the UE (e.g. E-RAB#1 provided via the MeNB and E-RAB#2 provided via the SeNB). In this case, for example, the following parameters may be configured (for the UE's non-GBR bearers):

$M_{UE\text{-}AMBR}$=5 Mbps (for communication bearers over E-RAB#1 via the MeNB)

$S_{uE\text{-}AMBR}$=5 Mbps (for communication bearers over E-RAB#2 via the SeNB)

However, when E-RAB#1 has almost no activity but the communication bearers over E-RAB#2 carry a large amount of data, it is possible that the aggregated data rate for E-RAB#2 may exceed the allowed 5 Mbps. In this case, therefore, the SeNB enforces the $S_{UE\text{-}AMBR}$ by dropping data packets for the UE that are determined to be above the user's allowance ($S_{UE\text{-}AMBR}$). This may result, from a user point of view, in the UE only receiving an effective 5 Mbps (assuming that E-RAB#1 has no activity and $S_{UE\text{-}AMBR}$ for E-RAB#2 is set to 5 Mbps) while the contracted UE-AMBR is 10 Mbps.

Downlink—Unnecessary Packet Dropping in MeNB:

Similarly, using the parameters of the previous example ($M_{UE\text{-}AMBR}$=5 Mbps and $S_{UE\text{-}AMBR}$=5 Mbps), there may be scenarios in which the MeNB may drop data packets for a particular UE unnecessarily.

For example, when E-RAB#2 via the SeNB has almost no activity but the communication bearers provided over E-RAB#1 carry a large amount of data, it is possible that the aggregated data rate for E-RAB#1 may exceed the allowed 5 Mbps via that base station (MeNB). The MeNB may thus start dropping data packets resulting, from a user point of view, in the UE only receiving an effective 5 Mbps while its contracted UE-AMBR is 10 Mbps.

It will be appreciated that similar scenarios are also possible for the enforcement of uplink UE-AMBRs.

In summary, when the communication bearers for a particular UE in dual connectivity exhibit an imbalance (at least temporarily) between the base stations serving the UE, it may be difficult or impossible to ensure that the aggregated data rate for a particular UE meets the data rate (UE-AMBR) associated with the user's subscription.

SUMMARY OF INVENTION

Accordingly, preferred embodiments of the present invention aim to provide methods and apparatus which overcome or at least partially alleviate at least one of the above issues.

In one aspect, the invention provides a base station configured to operate as part of a dual connectivity configuration in which a control-plane connection for a user communication device is provided via the base station and at least one communication bearer between a core network and the user communication device is provided via at least a further base station, said base station comprising: means for obtaining an aggregate maximum bit rate specific to said user communication device and for obtaining information relating to a data rate required for said user communication device via said further base station; means for generating information identifying a bit rate specific to said further base station, for use in enforcement of an aggregate maximum data throughput for said user communication device via said further base station, wherein said bit rate specific to said further base station is generated based on: i) said aggregate maximum bit rate specific to said user communication device; and ii) said obtained information relating to a data rate required for said user communication device via said further base station; and means for providing, to said further base station, said information identifying said bit rate specific to said further base station.

In one aspect, the invention provides a secondary base station configured to operate as part of a dual connectivity configuration in which a control-plane connection for a user communication device is provided via a master base station, different to said secondary base station, and at least one communication bearer between a core network and the user communication device is provided via said secondary base station, said secondary base station comprising: means for determining a data rate required for said user communication device via said secondary base station; means for providing, to said master base station, information relating to said determined data rate required for said user communication device via said secondary base station; and means for receiving, from said master base station, information identifying a bit rate specific to said secondary base station, wherein said bit rate specific to said secondary base station is based on: i) an aggregate maximum bit rate specific to said user communication device; and ii) said data rate required for said user communication device via said secondary base station.

In one aspect, the invention provides a system comprising the above described base station, the above described secondary base station, and a user communication device.

In one aspect, the invention provides a method performed by a base station configured to operate as part of a dual connectivity configuration in which a control-plane connection for a user communication device is provided via the base station and at least one communication bearer between a core network and the user communication device is provided via at least a further base station, the method comprising: obtaining an aggregate maximum bit rate specific to said user communication device, and information relating to a data rate required for said user communication device via said further base station; generating information identifying a bit rate specific to said further base station, for use in enforcement of a maximum data throughput for said user communication device via said further base station, wherein said bit rate specific to said further base station is generated based on: i) said aggregate maximum bit rate specific to said user communication device; and ii) said obtained information relating to a data rate required for said user communication device via said further base station; and providing, to said further base station, said information identifying said bit rate specific to said further base station.

In one aspect, the invention provides a method performed by a secondary base station configured to operate as part of a dual connectivity configuration in which a control-plane connection for a user communication device is provided via a master base station, different to said secondary base station, and at least one communication bearer between a core network and the user communication device is provided via said secondary base station, the method comprising: determining a data rate required for said user communication device via said secondary base station; providing, to said master base station, information relating to said determined data rate required for said user communication device via said secondary base station; and receiving, from said master base station, information identifying a bit rate specific to said secondary base station, wherein said bit rate specific to said secondary base station is based on: i) an aggregate maximum bit rate specific to said user communication device; and ii) said data rate required for said user communication device via said secondary base station.

The invention provides, for all methods disclosed, corresponding computer programs or computer program products for execution on corresponding equipment, the equipment itself (user equipment, nodes or components thereof) and methods of updating the equipment.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Embodiments of the invention will now be described, by way of example only, with reference to the attached figures in which:

FIG. 6 is an exemplary timing diagram illustrating a procedure performed by elements of the mobile telecommunication system; and FIG. 7 illustrates a modification of the procedure shown in FIG. 6.

FIG. 8 illustrates another modification of the procedure shown in FIG. 6.

DESCRIPTION OF EMBODIMENTS

<Overview>

Figure 1:
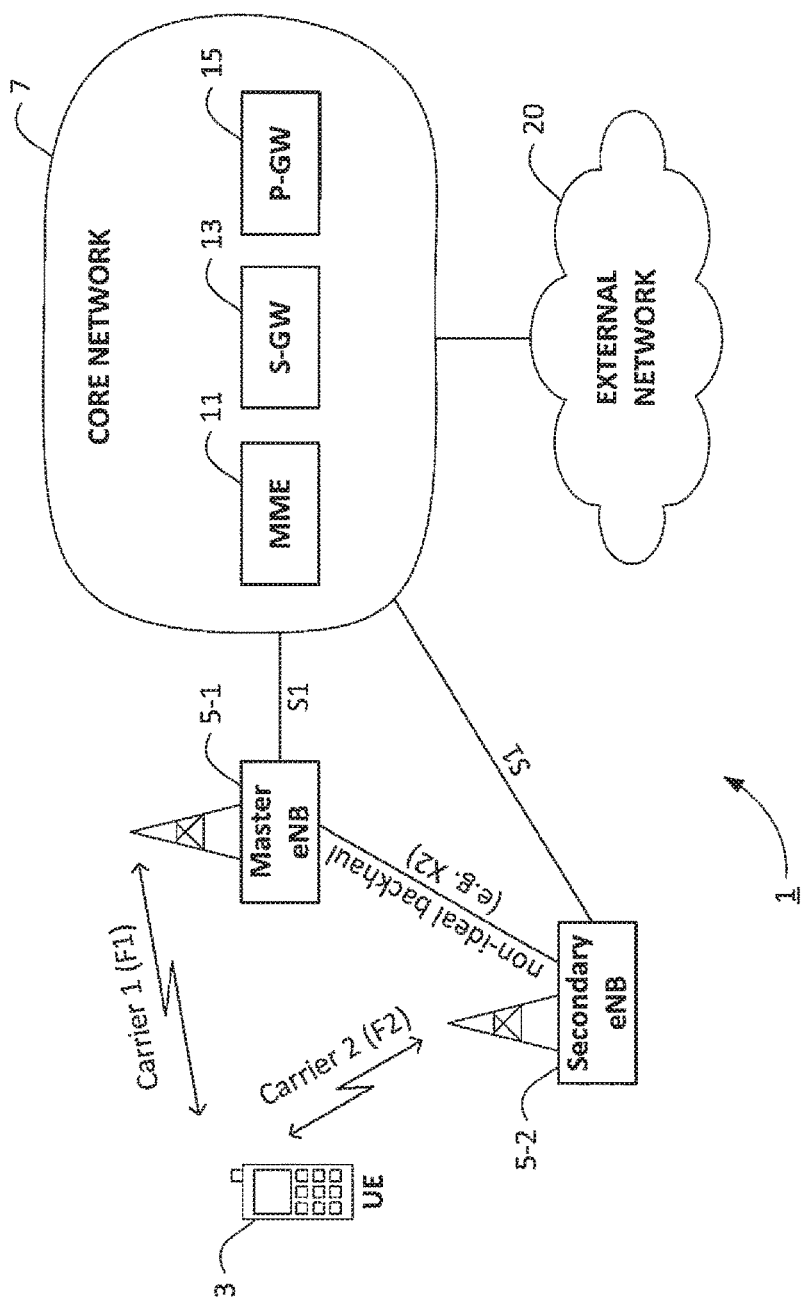
FIG. 1 schematically illustrates a mobile telecommunication system of a type to which the invention is applicable.

FIG. 1 schematically illustrates a mobile (cellular) telecommunication system 1 including a mobile telephone 3 (or other compatible communication device/user equipment) served via the base stations 5-1 and 5-2. As those skilled in the art will appreciate, whilst one mobile telephone 3 and two base stations 5 are shown in FIG. 1 for illustration purposes, the system, when implemented, will typically include other base stations and mobile telephones.

A user of the mobile telephone 3 can communicate with other users and/or remote servers via the base stations 5 and the core network 7. The core network 7 comprises, amongst other things, a mobility management entity (MME) 11, a serving gateway (S-GW) 13, and a Packet Data Network (PDN) Gateway (P-GW) 15.

The MME 11 manages general mobility aspects of the mobile telephone 3 and ensures that connectivity is maintained with the mobile telephone 3 as it is moving within the geographical area covered by the communication system (and/or as the mobile telephone 3 is handed over between base stations of the communication system). The MME 11 also handles control-plane signalling for the mobile telephone 3 and manages the various bearers associated with the mobile telephone 3 (e.g. such as an Evolved Packet System (EPS) bearer and/or a radio bearer) e.g. by controlling the S-GW 13 and the P-GW 15 (and/or possibly other network nodes) via which such bearers are provided.

The S-GW 13 provides a connection between the mobile telephone 3 and the core network 7 (via the base station 5-1) for sending and receiving user plane data over an associated communication bearer (e.g. an EPS bearer). The communication bearer normally terminates at the P-GW 15, although it is often complemented by an external bearer as well (for example, another EPS bearer and/or the like) between the P-GW 15 and a communication end-point outside the core network 7 (e.g. in an external network 20). It will be appreciated that, whilst shown as separate entities, the functionalities of the S-GW 13 and the P-GW 15 could be implemented in a single gateway element.

As will be understood by those skilled in the art, each base station 5 operates one or more base station cells (not shown) in which communications can be made between the base station 5 and the mobile telephone 3 using one or more suitable communication links (e.g. radio links) provided between the mobile telephone 3 and the respective serving base station 5. Each of the communication links may be carried over one or more associated component carriers (F1, F2).

In this system, a dual connectivity service can be provided to compatible user equipment (such as the mobile telephone 3) using an appropriately configured communication bearer or bearers (e.g. as specified in 3GPP TR 36.842). In the case of dual connectivity, one of the base stations is configured as a master base station (MeNB) 5-1 and the other base station is configured as a secondary base station (SeNB) 5-2. The base stations 5 are connected to each other via an appropriate base station to base station communication interface (e.g. an 'X2' interface). In this example, the base stations 5 are connected to each other using a non-ideal backhaul.

The MeNB 5-1 is connected to the core network 7 via an S1 interface in order to provide both user-plane ('S1-U') communication via the S-GW 13 (for MeNB-specific bearers and any split bearers) and control-plane ('S1-MME') communication with the MME 11 (for all bearers). The SeNB 5-2 is also connected to the core network 7 via an appropriate S1 interface in order to provide user-plane ('S1-U') communication over at least some of its communication bearers (e.g. SeNB-specific bearers). Although in FIG. 1 the SeNB 5-2 is shown to be connected to the core network 7 directly, it may also be connected indirectly, e.g. via the external network 20. Although not shown in FIG. 1, the SeNB 5-2 may also have user-plane ('S1-U') connectivity via the MeNB 5-1 over the non-ideal backhaul (e.g. when using a split bearer configuration).

The mobile telephone 3 may be configured with multiple communication bearers (for example, a first communication bearer for voice, a second communication bearer for video, a third communication bearer for internet data, etc.), e.g. in order to provide different transmission priorities for different services. Each communication bearer (and each data packet sent over the communication bearers) is associated with an appropriate quality of service (QoS) identifier, such as a QoS class indicator (QCI) value, in order ensure that the appropriate transmission priorities can be met regardless whether such communication bearers are provided via the MeNB 5-1, the SeNB 5-2, or both. Data associated with one of the mobile telephone's 3 communication bearers may be transmitted on the same radio link/carrier (although data for different bearers may be transmitted over different radio links/carriers).

In this system, the base stations 5-1, 5-2 (and the mobile telephone 3) are configured to provide dual connectivity using at least an SeNB-specific bearer, i.e. a communication bearer served via the SeNB 5-2 for communicating user-plane data for the mobile telephone 3. The setting up of such a bearer may be initiated by the MeNB 5-1, when appropriate. As part of this dual connectivity service, in this example, PDCP, RLC, MAC, and PHY functionalities for the communication bearer are provided by the SeNB 5-2. Thus, when a downlink data packet is received by the SeNB 5-1 (from the core network 7 over the S1 interface), the SeNB 5-1 performs appropriate processing of the data packet (and passes the data packet from the PDCP layer to the lower layers) for transmission towards the mobile telephone 3.

Advantageously, the base stations 5-1, 5-2 are also configured to enforce an associated aggregate maximum bit rate (i.e. UE-AMBR) parameter for the non-GBR communications of the mobile telephone 3. Specifically, the MeNB 5-1 obtains the value of the UE-AMBR from the MME 11 when it is setting up an initial context for the mobile telephone 3, e.g. as part of a connection establishment procedure between the mobile telephone 3 and the base station 5-1. The MeNB 5-1 is also configured to derive, from the obtained UE-AMBR, the applicable aggregate maximum bit rates $M_{UE\text{-}AMBR}$ and $S_{UE\text{-}AMBR}$ for the MeNB 5-1 and the SeNB 5-2, respectively. In this case, the $M_{UE\text{-}AMBR}$ and the $S_{UE\text{-}AMBR}$ may be chosen such that their sum is equal to the UE-AMBR, which ensures that the mobile telephone 3 does not exceed its associated aggregate maximum bit rate even when it is using a dual connectivity service.

For example, the MeNB 5-1 may be configured to derive, from the overall UE-AMBR to be enforced for a particular dual connectivity UE, an MeNB-specific UE-AMBR ($M_{UE\text{-}AMBR}$) for that UE and an SeNB-specific UE-AMBR ($S_{UE\text{-}AMBR}$) for that UE based on the following equation:

$$\text{UE-AMBR} = M_{UE\text{-}AMBR} + S_{UE\text{-}AMBR}$$

Each base station 5-1 and 5-2 is responsible for ensuring that an appropriate (base station specific) aggregate maximum bit rate is enforced for the mobile telephone 3 connected to that base station. Thus, the MeNB 5-1 enforces the $M_{UE\text{-}AMBR}$ for the mobile telephone's 3 communications via the MeNB's 5-1, and the SeNB 5-2 enforces the $S_{UE\text{-}AMBR}$ for the mobile telephone's 3 communications via the SeNB's 5-2.

Advantageously, in this example, the MeNB 5-1 is operable to obtain, from the SeNB 5-2, information relating to a current data rate for the mobile telephone 3 via the SeNB 5-2. The obtained information may comprise, for example, a data rate value measured at the SeNB 5-2, an indication that the data rate (via the SeNB 5-2) is above a predetermined threshold, an indication that a transmission buffer at the SeNB 5-2 is above a predetermined threshold, an indication that a predetermined number of data packets (e.g. at least one data packet) has been dropped at the SeNB 5-2, and/or the like. The information (data rate/indication) provided by the SeNB 5-2 may relate to the non-GBR bearers associated with the mobile telephone 3 at the SeNB 5-2, although it may relate to other bearers as well.

When appropriate, the MeNB 5-1 is beneficially able to update the applicable $M_{UE\text{-}AMBR}$ and/or $S_{UE\text{-}AMBR}$ based on the information obtained from the SeNB 5-2 and provide an updated $S_{UE\text{-}AMBR}$ to the SeNB 5-2.

For example, when the obtained information indicates that the mobile telephone's 3 data rate via the SeNB 5-2 is likely to exceed (or has exceeded) the associated data rate allowance ($S_{UE\text{-}AMBR}$), and the MeNB 5-1 determines that its own data rate is (at least momentarily) below the associated data rate allowance ($M_{UE\text{-}AMBR}$), the MeNB 5-1 is able to update the applicable $M_{UE\text{-}AMBR}$ and/or $S_{UE\text{-}AMBR}$ parameters to alleviate the risk of a potential drop of data packets at the SeNB 5-2. For example, the MeNB 5-1 may decrease the value of the $M_{UE\text{-}AMBR}$ parameter and increase the value of the $S_{UE\text{-}AMBR}$ parameter (but ensuring that UE-AMBR=$M_{UE\text{-}AMBR}$+$S_{UE\text{-}AMBR}$). Once an updated $S_{UE\text{-}AMBR}$ parameter is derived by the MeNB 5-1, it is forwarded to the SeNB 5-2 (over the X2 interface) so that the SeNB 5-2 can apply the updated $S_{UE\text{-}AMBR}$ parameter to the mobile telephone's 3 subsequent communications via the SeNB 5-2.

Similarly, when the obtained information indicates that the mobile telephone's 3 data rate via the SeNB 5-2 is below the associated data rate allowance ($S_{UE\text{-}AMBR}$), and the MeNB 5-1 determines that its own data rate is (at least momentarily) is about to exceed the associated data rate allowance ($M_{UE\text{-}AMBR}$), the MeNB 5-1 is able to update the applicable $M_{UE\text{-}AMBR}$ and/or $S_{UE\text{-}AMBR}$ parameters to alleviate the risk of a potential drop of data packets at the MeNB 5-1. For example, the MeNB 5-1 may increase the value of the $M_{UE\text{-}AMBR}$ parameter and decrease the value of the $S_{UE\text{-}AMBR}$ parameter (but ensuring that UE-AMBR=$M_{UE\text{-}AMBR}$+$S_{UE\text{-}AMBR}$). Once an updated $S_{UE\text{-}AMBR}$ parameter is derived by the MeNB 5-1, it is forwarded to the SeNB 5-2 (over the X2 interface) so that the SeNB 5-2 can apply the updated $S_{UE\text{-}AMBR}$ parameter to the mobile telephone's 3 subsequent communications via the SeNB 5-2.

In summary, when the communication bearers for a particular UE in dual connectivity exhibit an imbalance (at least temporarily) between the base stations serving the UE, it is possible to ensure, based on the information exchanged between the base stations 5-1 and 5-2, that the aggregated data rate for a particular UE (via all base stations involved in the dual connectivity service) meets the data rate (UE-AMBR) associated with the user's subscription.

<Mobile Telephone>

Figure 2:
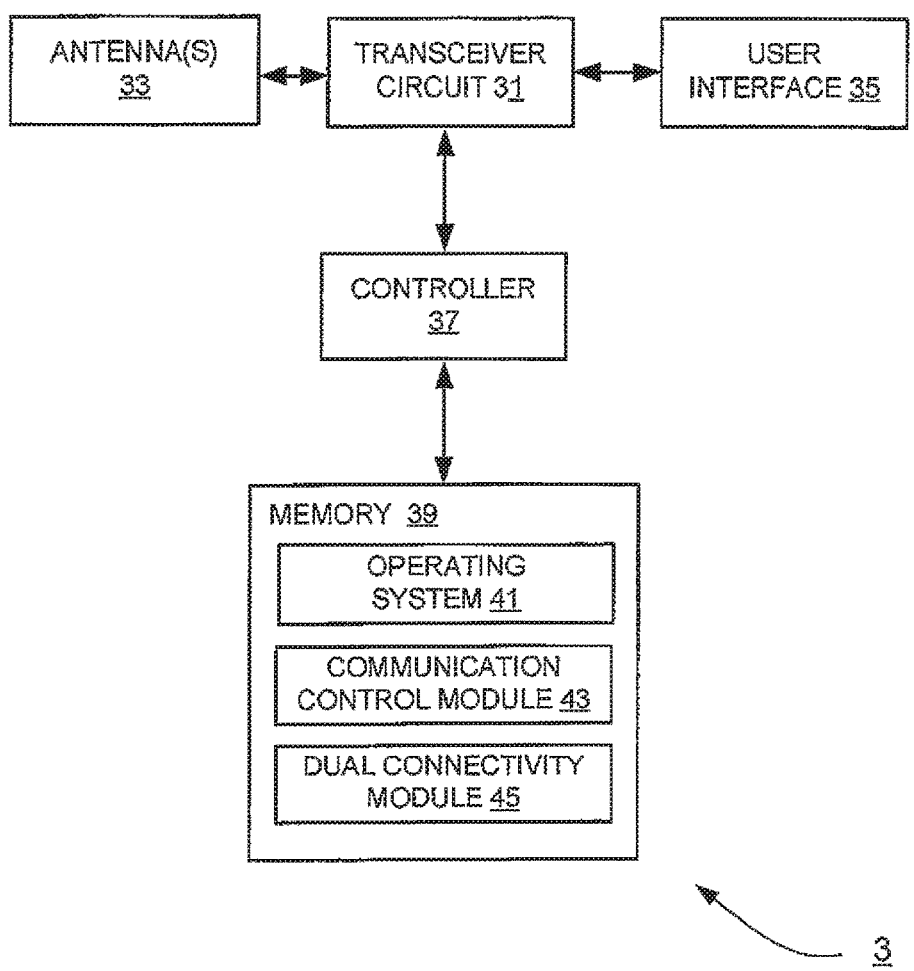
FIG. 2 is a block diagram illustrating the main components of the mobile telephone forming part of the system shown in FIG. 1.

FIG. 2 is a block diagram illustrating the main components of the mobile telephone 3 shown in FIG. 1. As shown, the mobile telephone 3 has a transceiver circuit 31 that is operable to transmit signals to and to receive signals from a base station 5 via one or more antenna 33. The mobile telephone 3 has a controller 37 to control the operation of the mobile telephone 3. The controller 37 is associated with a memory 39 and is coupled to the transceiver circuit 31. Although not necessarily shown in FIG. 2, the mobile telephone 3 may of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile telephone 3 by, in this example, program instructions or software instructions stored within memory 39. As shown, these software instructions include, among other things, an operating system 41, a communications control module 43, and a dual connectivity module 45.

The communications control module 43 controls communications between the mobile telephone 3 and the base station(s) 5. The communications control module 43 also controls the separate flows of uplink data and downlink data and control data to be transmitted to the base station 5 (and other nodes, e.g. the MME 11, via the base station 5).

The dual connectivity module 45 coordinates (with assistance by the communications control module 43) communications over the respective communication bearer(s) forming part of a dual connectivity service. The dual connectivity module 45 also controls communications with the MeNB 5-1 over the associated carrier F1 and communications with the SeNB 5-2 over the associated carrier F2.

<Master Base Station>

Figure 3:
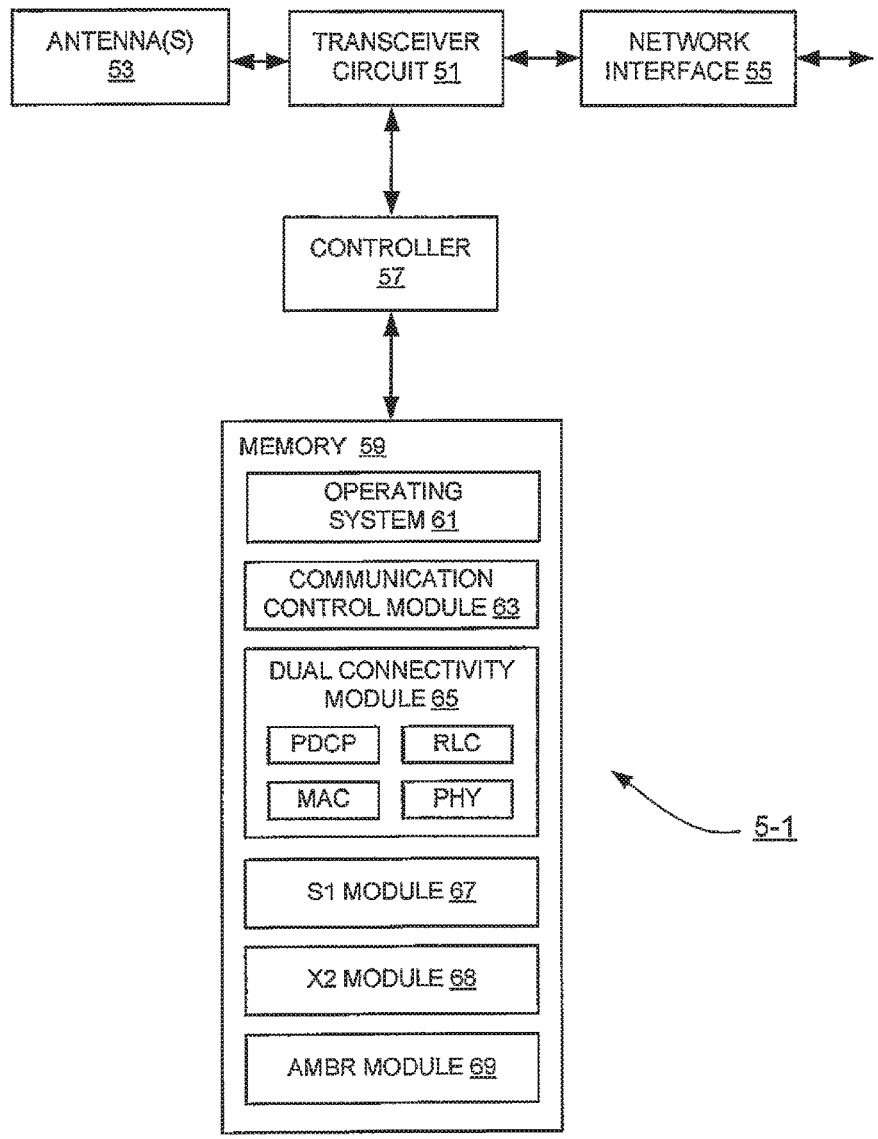
FIG. 3 is a block diagram illustrating the main components of the master base station forming part of the system shown in FIG. 1.

FIG. 3 is a block diagram illustrating the main components of the master base station 5-1 shown in FIG. 1. The master base station 5-1 is a communications node providing services to user equipment 3 within its coverage area. In the embodiments according to the invention, communications between the various base stations 5 and the mobile telephone 3 are coordinated. As shown, the master base station 5-1 includes a transceiver circuit S1 which transmits signals to, and receives signals from, the mobile telephone 3 via at least one antenna 53. The master base station 5-1 also transmits signals to and receives signals from the core network 7 and other neighbouring base stations (e.g. the SeNB 5-2) via a network interface 55 (X2/non-ideal backhaul interface for communicating with neighbouring base stations and S1 interface for communicating with the core network 7). The operation of the transceiver circuit 51 is controlled by a controller 57 in accordance with software stored in memory 59. The software includes, among other things, an operating system 61, a communications control module 63, a dual connectivity module 65, an S1 module 67, an X2 module 68, and an AMBR module 69.

The communications control module 63 controls communications between the master base station 5-1 and the SeNB 5-2, the mobile telephone 3, and the core network devices.

The dual connectivity module 65 coordinates communications over the communication bearer (or bearers) forming part of a dual connectivity service for the mobile telephone 3 served by this base station.

The dual connectivity module 65 includes the PDCP, RLC, MAC, and PHY entities (layers) responsible for communicating data packets (that belong to MeNB-specific bearers) via the base station 5-1 when it is configured as an MeNB.

The S1 module 67 handles S1 signalling (e.g. generates, sends, and receives messages/PDUs formatted in accordance with the S1 protocol) between the base station 5 and the core network 7 entities (such as the MME 11 and the S-GW 13). For example, the S1 module 67 is responsible for receiving downlink data packets from the core network 7 and passing the received data packets to the dual connectivity module 65 (via the PDCP entity), when the base station 5-1 is configured to operate as an MeNB.

The X2 module 68 handles X2 signalling (e.g. generates, sends, and receives messages/PDUs formatted in accordance with the X2 application protocol) between the master base station 5 and other base stations, such as the secondary base station 5-2. For example, the X2 module 68 is responsible for exchanging, with the corresponding X2 module of the secondary base station 5-2, signalling (e.g. control signalling and/or data packets) relating to the SeNB-specific bearer.

The AMBR module 69 is responsible for ensuring that an appropriate aggregate maximum bit rate is enforced for the data packets transmitted for each items of user equipment (such as the mobile telephone 3) served by this base station (either directly, or indirectly, via another base station as part of a dual connectivity service). In order to do so, the AMBR module 69 obtains, from the MME 11 and for each mobile telephone 3 served by this base station 5-1, information identifying the aggregate maximum bit rate allowed (e.g. subscribed) for the user associated with that mobile telephone 3. When dual connectivity is configured for a particular mobile telephone 3, the AMBR module 69 determines the applicable aggregate maximum bit rates $M_{UE\text{-}AMBR}$ and $S_{UE\text{-}AMBR}$ for use in enforcement of a maximum throughput for the mobile telephone's 3 non-GBR communication bearers at the MeNB 5-1 and the SeNB 5-2, respectively. The AMBR module 69 enforces the $M_{UE\text{-}AMBR}$ for the MeNB's 5-1 communications with the mobile telephone 3 (e.g. for MeNB-specific bearers), and provides (via the X2 module 68) the applicable $S_{UE\text{-}AMBR}$ to the SeNB 5-2 (for SeNB-specific bearers, and optionally split bearers).

In some embodiments, the AMBR module 69 is configured to obtain (e.g. via the X2 module 68) information relating to a current data rate for the mobile telephone 3 via the SeNB 5-2. The obtained information may comprise, for example, a data rate value measured at the SeNB 5-2, an indication that the data rate (via the SeNB 5-2) is above a predetermined threshold, an indication that a transmission buffer at the SeNB 5-2 is above a predetermined threshold, an indication that a predetermined number of data packets (e.g. at least one data packet) has been dropped at the SeNB 5-2, and/or the like. When appropriate, the AMBR module 69 updates the applicable $M_{UE\text{-}AMBR}$ and/or $S_{UE\text{-}AMBR}$ based on the information obtained from the SeNB 5-2 and provides the updated $S_{UE\text{-}AMBR}$ to the SeNB 5-2.

<Secondary Base Station>

Figure 4:
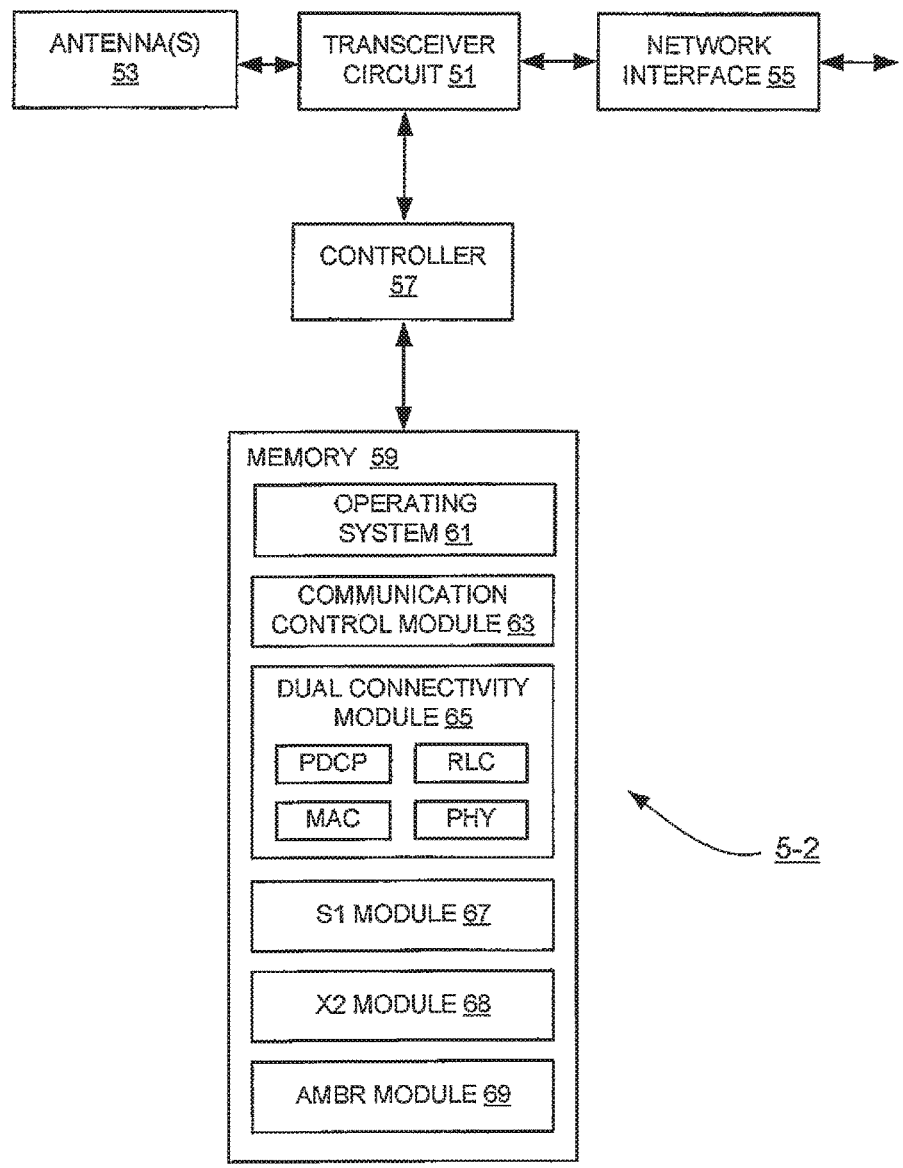
FIG. 4 is a block diagram illustrating the main components of the secondary base station forming part of the system shown in FIG. 1.

FIG. 4 is a block diagram illustrating the main components of the secondary base station 5-2 shown in FIG. 1. The secondary base station 5-2 is a communications node providing services to user equipment 3 within its coverage area. As shown, the secondary base station 5-2 includes a transceiver circuit 51 which transmits signals to, and receives signals from, the mobile telephone 3 via at least one antenna 53. The secondary base station 5-2 also transmits signals to and receives signals from the core network 7 and other neighbouring base stations (e.g. the MeNB 5-1) via a network interface 55 (X2/non-ideal backhaul interface for communicating with neighbouring base stations and an optional S1 interface for communicating with the core network 7). The operation of the transceiver circuit 51 is controlled by a controller 57 in accordance with software stored in memory 59. The software includes, among other things, an operating system 61, a communications control module 63, a dual connectivity module 65, an S1 module 67, an X2 module 68, and an AMBR module 69.

The communications control module 63 controls communications between the secondary base station 5-2 and the MeNB 5-1, the mobile telephone 3, and the core network devices.

The dual connectivity module 65 coordinates communications over the communication bearer (or bearers) forming part of a dual connectivity service for the mobile telephone 3 served by this base station.

The dual connectivity module 65 includes the PDCP, RLC, MAC, and PHY entities (layers) responsible for communicating data packets via the base station 5-2 when it is configured as an SeNB.

The S1 module 67 handles S1 signalling (e.g. generates, sends, and receives messages/PDUs formatted in accordance with the S1 protocol) between the base station 5 and the core network 7 entities (such as the MME 11 and the S-GW 13).

The X2 module 68 handles X2 signalling (e.g. generates, sends, and receives messages/PDUs formatted in accordance with the X2 application protocol) between the secondary base station 5-2 and other base stations, such as the master base station 5-1. For example, the X2 module 68 is responsible for exchanging, with the corresponding X2 module of the master base station 5-1, signalling (e.g. control signalling) relating to the SeNB-specific bearer.

The AMBR module 69 is responsible for ensuring that an appropriate aggregate maximum bit rate is enforced for the data packets transmitted for each items of user equipment (such as the mobile telephone 3) connected to this base station 5-2 whilst configured as an SeNB. In order to do so, the AMBR module 69 obtains, from the MeNB 5-1 and for each mobile telephone 3 served by this base station 5-2, information identifying the aggregate maximum bit rate allowed ($S_{UE\text{-}AMBR}$) for that mobile telephone 3 via the base station 5-2 (for the mobile telephone's 3 SeNB-specific bearers). The AMBR module 69 enforces the $S_{UE\text{-}AMBR}$ for the SeNB's 5-2 communications with the mobile telephone 3.

In some embodiments, the AMBR module 69 is configured to obtain (e.g. from the dual connectivity module 65) information relating to a current data rate for the mobile telephone 3 via the SeNB 5-2. The obtained information may comprise, for example, a data rate value measured at the SeNB 5-2, an indication that the data rate (via the SeNB 5-2) is above a predetermined threshold, an indication that a transmission buffer at the SeNB 5-2 is above a predetermined threshold, an indication that a predetermined number of data packets (e.g. at least one data packet) has been dropped at the SeNB 5-2, and/or the like. When appropriate, the AMBR module 69 provides (via the X2 module 68) the information obtained from dual connectivity module 65 to the MeNB 5-1.

In the above description, the mobile telephone 3 and the base stations 5 are described for ease of understanding as having a number of discrete modules (such as the communications control modules and the dual connectivity modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

<Operation>

A number of different examples will now be described that illustrate how the invention can be put into effect using the mobile telephone 3 and the base stations 5 (as exemplary dual connectivity network points) of FIG. 1. As discussed above, dual connectivity service can be provided by configuring the mobile telephone 3 to communicate with both the MeNB 5-1 and at least one SeNB 5-2, using respective communication bearers.

Figure 5:
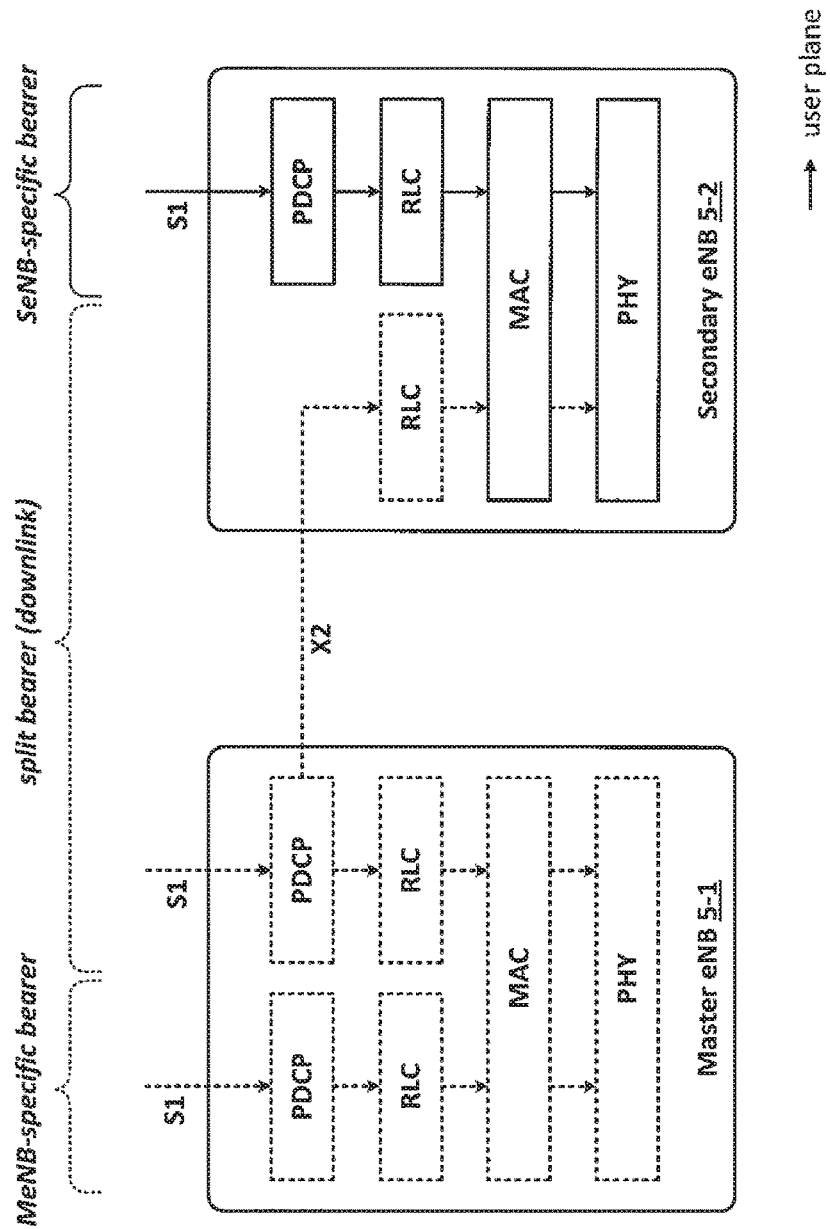
FIG. 5 illustrates an exemplary way in which dual connectivity can be provided in the system shown in FIG. 1 using an SeNB-specific bearer.

FIG. 5 illustrates (using continuous lines) an exemplary bearer configuration for the provision of an SeNB-specific communication bearer. For comparison, FIG. 5 also illustrates (using dashed lines) an MeNB-specific bearer and a split bearer, the descriptions of which are omitted herein for the sake of simplicity. In FIG. 5, some of the protocol layers and functions (e.g. control-plane) implemented by the base stations 5 are also omitted. Whilst FIG. 5 illustrates the downlink direction only (as indicated by the arrows), a similar bearer configuration may be realised for the uplink direction as well, e.g. by reversing the direction of data transmissions, where appropriate.

In the case of an SeNB-specific bearer, the S1 control-plane (e.g. 'S1-MME') for the mobile telephone 3 is provided by the MeNB 5-1. Control-plane signalling for the mobile telephone 3 can be exchanged with the SeNB 5-2 via the base station to base station interface (e.g. X2), when required, or it can be communicated directly between the MeNB 5-1 and the mobile telephone 3.

In a conventional or 'regular' communication bearer configuration that may be used in a both single and dual connectivity scenarios, the MeNB 5-1 handles the S1 user-plane for a communication bearer (e.g. a communication bearer that is associated with carrier F1 of FIG. 1) associated with the mobile telephone 3. Downlink data packets for the mobile telephone 3 are received by the MeNB 5-1 at the PDCP layer, and forwarded to the lower layers (i.e. the RLC, MAC, and PHY layers) for transmission to the mobile telephone 3.

In this case, as indicated by the dashed arrows between the PDCP, RLC, MAC, and PHY layers of the MeNB 5-1, (downlink) user data from the core network 7 is processed within the base station 5-1, and transmitted over the air interface (using carrier F1) between the base station 5-1 and the mobile telephone 3 (not shown in FIG. 5) using the services of the PHY layer.

According to the communication bearer configuration of the SCG type that may be used in a dual connectivity scenario (shown in continuous lines in FIG. 5), user-plane communication (e.g. a communication bearer that is associated with carrier F2 of FIG. 1) may be provided for the mobile telephone 3 via the SeNB 5-2, without involving the MeNB 5-1. In this case, downlink data packets can be sent from a remote endpoint over an associated communication bearer through the core network 7 (e.g. via the S-GW 13) and received at the PDCP layer of the SeNB 5-2. After PDCP processing, the data packets are passed to the RLC layer, then to the MAC layer, before they are transmitted to the mobile telephone 3 (not shown in FIG. 5) over the PHY layer of the SeNB 5-2 (using carrier F2).

Example 1

First Embodiment

FIG. 6 is an exemplary timing diagram illustrating a procedure performed by elements of the mobile telecommunication system 1.

The procedure begins in step S601, in which the MME 11 provides the value of the UE-AMBR parameter to the MeNB 5-1. In this case, the UE-AMBR is provided as part of an initial context setup procedure for the mobile telephone 3. Although not shown in FIG. 6, it will be appreciated that the MME 11 may be configured to derive the value of the UE-AMBR from subscription data for a user associated with the mobile telephone 3. Such subscription data may be obtained from another entity, e.g. a Home Subscriber Server (HSS), as appropriate.

Next, the MeNB 5-1 derives the (UE-specific) $M_{UE\text{-}AMBR}$ and $S_{UE\text{-}AMBR}$ parameters from the UE-AMBR, e.g. such that the sum of the $M_{UE\text{-}AMBR}$ and the $S_{UE\text{-}AMBR}$ does not exceed the value of the UE-AMBR. For example, the MeNB 5-1 may be configured to distribute, at least initially, the aggregated maximum data rate (UE-AMBR) equally between the base stations 5-1 and 5-2, i.e. both the $M_{UE\text{-}AMBR}$ and the $S_{UE\text{-}AMBR}$ may be set to 50% of the UE-AMBR associated with the mobile telephone 3. However, the MeNB 5-1 may also be configured to allocate a larger part (percentage) of the aggregated maximum data rate to one base station than the part of the aggregated maximum data rate it allocates to the other base station. As generally shown in step S603, the MeNB 5-1 and SeNB 5-2 are thus able to apply their respective $M_{UE\text{-}AMBR}$ and $S_{UE\text{-}AMBR}$ parameters for the mobile telephone's 3 communications via that base station 5-1 and 5-2.

In step S605, which may be performed e.g. in response to a request (shown at S604) and/or periodically, the SeNB 5-2 (using its AMBR module 69) determines a data rate for the (SeNB-specific) communication bearers (e.g. non-GBR bearers) associated with the mobile telephone 3 (via the SeNB 5-2). Once the data rate associated with the mobile telephone 3 has been determined, the SeNB 5-2 (using its X2 module 68) generates and sends, in step S607, an appropriately formatted signalling message (e.g. an 'E-RAB Status Report' X2 message) to the MeNB 5-1, and includes in this message (e.g. in a suitable information element thereof) information identifying the mobile telephone's 3 data rate.

In step S609, the MeNB 5-1 (using its AMBR module 69), derives updated (UE-specific) $M_{UE\text{-}AMBR}$ and $S_{UE\text{-}AMBR}$ parameters (e.g. such that UE-AMBR=$M_{UE\text{-}AMBR}$+$S_{UE\text{-}AMBR}$) by taking into account the received information identifying the mobile telephone's 3 data rate at the SeNB 5-2. For example, the MeNB 5-1 (using its AMBR module 69) may increase the value of the $S_{UE\text{-}AMBR}$ parameter (and simultaneously decrease the value of the $M_{UE\text{-}AMBR}$ parameter such that UE-AMBR=$M_{UE\text{-}AMBR}$+$S_{UE\text{-}AMBR}$) when the information received from the SeNB 5-2 indicates that the mobile telephone's 3 data rate at the SeNB 5-2 is likely to exceed the currently enforced $S_{UE\text{-}AMBR}$ (configured at S603), and the AMBR module 69 of the MeNB 5-1 determines that the MeNB's 5-1 data rate does not exceed the data rate allowance ($M_{UE\text{-}AMBR}$) associated with the mobile telephone 3. Similarly, the MeNB 5-1 (using its AMBR module 69) may increase the value of the $M_{UE\text{-}AMBR}$ parameter and simultaneously decrease the value of the $S_{UE\text{-}AMBR}$ parameter (such that UE-AMBR=$M_{UE\text{-}AMBR}$+$S_{UE\text{-}AMBR}$) when the information received from the SeNB 5-2 indicates that the mobile telephone's 3 data rate at the SeNB 5-2 does not exceed the currently enforced $S_{UB\text{-}AMBR}$ (configured at S603), and the AMBR module 69 of the MeNB 5-1 determines that the MeNB's 5-1 data rate is likely to exceed the data rate allowance ($M_{UE\text{-}AMBR}$) associated with the mobile telephone 3.

Once an updated $S_{UE\text{-}AMBR}$ parameter is derived by the MeNB 5-1, the MeNB 5-1 (using its AMBR module 69) generates and sends, at step S611, an appropriately formatted signalling message to the SeNB 5-2 (over the X2 interface), and includes in this message the updated $S_{UE\text{-}AMBR}$.

In step S613, the SeNB 5-2 (using its AMBR module 69) starts to apply the updated $S_{UE\text{-}AMBR}$ parameter to the mobile telephone's 3 subsequent communications via the SeNB 5-2. Similarly, as shown in step S615, the MeNB 5-1 (using its AMBR module 69) also starts to apply the updated $M_{UE\text{-}AMBR}$ parameter to the mobile telephone's 3 subsequent communications via the MeNB 5-1.

Example 2

Second Embodiment

FIG. 7 illustrates a modification of the procedure shown in FIG. 6. In this case, steps S701 and S703 correspond to S601 and S603, respectively, thus their description is omitted herein.

However, in this example, as generally shown at step S705, the SeNB 5-2 (using its dual connectivity module 65) determines that a predetermined number of data packets (e.g. at least one data packet) has been dropped (i.e. failed to be sent) for the mobile telephone 3, due to the enforcement of the associated $S_{UE\text{-}AMBR}$ parameter.

Therefore, the SeNB 5-2 2 (using its X2 module 68) generates and sends, in step S707, an appropriately formatted signalling message (e.g. an 'E-RAB Status Report' X2 message) to the MeNB 5-1, and includes in this message (e.g. in a suitable information element thereof) an indication that one or more data packets for the mobile telephone 3 have been dropped (could not be delivered) due to data rate enforcement.

In step S709, by taking into account the received indication, the MeNB 5-1 (using its AMBR module 69), derives updated (UE-specific) $M_{UE-AMBR}$ and $S_{UE-AMBR}$ parameters (e.g. such that UE-AMBR=$M_{UE-AMBR}$+$S_{UE-AMBR}$).

For example, the MeNB 5-1 (using its AMBR module 69) may increase the value of the $S_{UE-AMBR}$ parameter (and simultaneously decrease the value of the $M_{UE-AMBR}$ parameter such that UE-AMBR=$M_{UE-AMBR}$ $S_{UE-AMBR}$) when the SeNB's 5-2 message indicates that a predetermined amount of data packets have been dropped (assuming that the MeNB's 5-1 data rate does not exceed the data rate allowance ($M_{UE-AMBR}$) associated with the mobile telephone 3). Similarly, the MeNB 5-1 may decrease the value of the $S_{UE-AMBR}$ parameter (and simultaneously increase the value of the $M_{UE-AMBR}$ parameter such that UE-AMBR=$M_{UE-AMBR}$ $S_{UE-AMBR}$) when the SeNB's 5-2 message indicates that no data packets have been dropped (e.g. since applying the current $S_{UE-AMBR}$ parameter and/or since a preceding notification was sent by the SeNB).

Advantageously, the MeNB 5-1 may be able to increase (e.g. gradually) its own data rate allocation ($M_{UE-AMBR}$) for the mobile telephone 3 as long the mobile telephone's 3 communications via the SeNB 5-2 remain unaffected (e.g. no packets are dropped at the SeNB 5-2).

Example 3

Third Embodiment

FIG. 8 illustrates another exemplary modification of the procedure shown in FIG. 6. In this case, steps S801 and S803 correspond to S601 and S603, respectively, thus their description is omitted herein.

However, in this example, as generally shown at step S805, the SeNB 5-2 (using its dual connectivity module 65) determines that the status of its transmission buffer meets a predetermined trigger (e.g. the transmission buffer and/or processing time is above a predetermined threshold). It will be appreciated that such predetermined trigger may result from the enforcement of the $S_{UE-AMBR}$ parameter associated with the mobile telephone 3.

Therefore, the SeNB 5-2 2 (using its X2 module 68) generates and sends, in step S807, an appropriately formatted signalling message (e.g. an 'E-RAB Status Report' X2 message) to the MeNB 5-1, and includes in this message (e.g. in a suitable information element thereof) information relating to the status of its transmission buffer (for the mobile telephone 3). It will be appreciated that the information relating to the status of the SeNB's 5-2 transmission buffer may also be sent periodically, i.e. regardless whether or not a trigger has been detected at step S805.

In step S809, by taking into account the received information relating to the status of the SeNB's 5-2 transmission buffer, the MeNB 5-1 (using its AMBR module 69), derives updated (UE-specific) $M_{UE-AMBR}$ and $S_{UE-AMBR}$ parameters (e.g. such that UE-AMBR=$M_{UE-AMBR}$$S_{UE-AMBR}$).

For example, the MeNB 5-1 (using its AMBR module 69) may increase the value of the $S_{UE-AMBR}$ parameter (and simultaneously decrease the value of the $M_{UE-AMBR}$ parameter such that UE-AMBR=$M_{UE-AMBR}$ $S_{UE-AMBR}$) when the SeNB's 5-2 message indicates that SeNB's 5-2 transmission buffer is over a predetermined threshold (assuming that the MeNB's 5-1 data rate does not exceed the data rate allowance ($M_{UE-AMBR}$) associated with the mobile telephone 3). Similarly, the MeNB 5-1 may decrease the value of the $S_{UE-AMBR}$ parameter (and simultaneously increase the value of the $M_{UE-AMBR}$ parameter such that UE-AMBR= $M_{UE-AMBR}$+$S_{UE-AMBR}$) when the SeNB's 5-2 message indicates that the SeNB's 5-2 transmission buffer is not over (e.g. it is below) a predetermined threshold. Advantageously, the MeNB 5-1 may be able to increase (e.g. gradually) its own data rate allocation ($M_{UE-AMBR}$) for the mobile telephone 3 as long the mobile telephone's 3 communications via the SeNB 5-2 remain unaffected (e.g. the transmission buffer at the SeNB 5-2 stays below the predetermined threshold).

Modifications and Alternatives

Detailed embodiments have been described above. As those skilled in the art will appreciate, a number of modifications and alternatives can be made to the above embodiments whilst still benefiting from the inventions embodied therein.

In the above examples, the MeNB is described to comprise a macro base station. However, it will be appreciated that the MeNB may comprises any type of base station, e.g. a pico base station, a femto base station, a home base station. Further, it will be appreciated that either of the carriers F1 and/or F2 may be provided via a relay, a remote radio head, and/or the like instead of a base station.

In the above examples, each base station is described to provide a single carrier (F1 or F2). However, it will be appreciated that each base station may provide a plurality of carriers (e.g. the same and/or different set of carriers).

It will be appreciated that whilst the above examples are described with reference to a communication bearer of the SCG type, the description is equally applicable to any other types of communication bearers, including MeNB-specific and/or 'split' communication bearers (e.g. as specified in 3GPP TR 36.842).

In the above description of FIG. 5, there is only one instance of MCG bearer, one instance of SCG bearer, and one instance of split bearer shown. However, it will be appreciated that any number and/or any types of bearers, in any combination may be provided for a particular UE. For example, multiple bearers of each type and/or any combination of bearers of different types may be provided. In any case, the actual bearer configuration is based on the associated QCI value. For example, if there are two SCG bearers (both bearers being non-GBR) for a particular UE, then the aggregate data rate on these two SCG bearers should not exceed the $S_{UE-AMBR}$ associated with the UE. In another example, if there is one split bearer and one SCG bearer for a particular UE (both bearers being non-GBR), then the aggregate data rate on the SCG bearer and on the SeNB part of the split bearer should not exceed the $S_{UE-AMBR}$ associated with the UE.

In the above embodiments, the MeNB is described to derive (and provide to the SeNB) an updated $S_{UE-AMBR}$ parameter by taking into account the information (data rate, packet drop indication, and/or the like) received from the SeNB. However, it will be appreciated that the MeNB may also be configured to send an indication to the SeNB to discard or ignore, at least temporarily, any previously sent $S_{UE-AMBR}$ parameter (instead of deriving an updated $S_{UE-AMBR}$ parameter). This may beneficially allow the SeNB to avoid unnecessarily dropping data packets for the mobile telephone. In this case, the SeNB may be configured to suspend enforcement of the $S_{UE-AMBR}$ parameter at least until a predetermined time period, until receipt of a new $S_{UE-AMBR}$ parameter from the MeNB, and/or until the SeNB has emptied or reduced below a threshold the amount of data held in its transmit buffer for the mobile telephone.

In the above description of FIG. 6, the SeNB is described to generate and send an 'E-RAB Status Report' signalling message formatted in accordance with the X2 application protocol. However, it will be appreciated that a different message and/or a different application protocol may also be used. For example, the SeNB may be configured to include information relating to its data rate in a suitable field (e.g. an 'enforcement result' field, 'AMBR information' field, 'data rate' field and/or the like) in a Frame Protocol message.

It will be appreciated that the SeNB may generate and send the data rate information (at step S607) either periodically and/or when a predetermined trigger is met. Such a predetermined trigger may include any of the following:
- the data rate for the mobile telephone is higher than (or equal to) the associated $S_{UE\text{-}AMBR}$;
- the data rate for the mobile telephone is higher than (or equal to) the associated $S_{UE\text{-}AMBR}$ minus an offset (e.g. 10% below the $S_{UE\text{-}AMBR}$)
- expiry of an associated timer;
- transmission buffer being over a predetermined threshold (which may be indicative of an insufficient for $S_{UE\text{-}AMBR}$ being configured for the mobile telephone);
- a sudden change (e.g. increase/decrease) in the data rate required for the mobile telephone;
- the SeNB has additional capacity that can be allocated to communication bearers associated with the mobile telephone;
- receipt of a data rate error indication from the mobile telephone (or from lower layers of the SeNB); and
- receipt of a request from the MeNB (e.g. as shown at step S604).

It will be appreciated that when the SeNB sends the packet drop indication to the MeNB (at step S707), it may also send information identifying the data rate for the mobile telephone. In other words, steps S607 and S707 may be combined.

It will also be appreciated that the SeNB may be configured to provide, to the MeNB over the X2 interface, information identifying the number of data packets discarded during a given time period (e.g. at the RLC and/or MAC layers). Based on this information, the MeNB may be able to determine a measure of an associated "Packet Discard Rate" at the SeNB (for the mobile telephone), and update the $M_{UE\text{-}AMBR}$ and/or $S_{UE\text{-}AMBR}$ accordingly. For example, the MeNB may increase the value of the $S_{UE\text{-}AMBR}$ by at least the determined "Packet Discard Rate" for the mobile telephone (up to the associated UE-AMBR).

It will be appreciated that the base stations (MeNB and SeNB) may be configured to provide each other information relating to their own data rates for the mobile telephone served by both base stations. Further, it will be appreciated that the MeNB may be configured to determine under-utilisation of its communication resources allocated for the mobile telephone (e.g. the MeNB may be configured to determine that the mobile telephone's data rate via the MeNB is below a threshold value/percentage and/or it is below the associated $M_{UE\text{-}AMBR}$ minus an offset). In this case, the MeNB may be configured to provide an appropriate indication to the SeNB, which in turn may cause the SeNB to exceed/ignore, at least temporarily, the associated $S_{UE\text{-}AMBR}$ for the mobile telephone (whilst still enforcing the UE-AMBR value, i.e. $M_{UE\text{-}AMBR} + S_{UE\text{-}AMBR}$).

Alternatively, the MeNB may be configured to inform the MME about the current values of the $M_{UE\text{-}AMBR}$ and/or the $S_{UE\text{-}AMBR}$ to be enforced at the MeNB and the SeNB, respectively. In this case, the MME may be configured to forward the values of the $M_{UE\text{-}AMBR}$ and/or the $S_{UE\text{-}AMBR}$ to the S-GW and the S-GW may be configured to forward the values of the $M_{UE\text{-}AMBR}$ and/or the $S_{UE\text{-}AMBR}$ to the P-GW. Advantageously, the P-GW may be able to perform the enforcement of the $M_{UE\text{-}AMBR}$ and/or the $S_{UE\text{-}AMBR}$ parameters (e.g. by performing data rate enforcement with the value of $M_{UE\text{-}AMBR}$ for communication bearers provided via the MeNB and performing data rate enforcement with the value of $S_{UE\text{-}AMBR}$ for communication bearers provided via the SeNB). This alternative may require a new (or modified) signalling message to be sent between the MeNB and the MME over the S1 interface (i.e. for the provision of the $M_{UE\text{-}AMBR}$ and/or the $S_{UE\text{-}AMBR}$ to the MME).

The base station (e.g. MeNB) may comprise means for deriving a bit rate specific to the base station, wherein the sum of the bit rate specific to the base station and the bit rate specific to the further base station (e.g. SeNB) does not exceed the aggregate maximum bit rate specific to the user communication device.

The information relating to a data rate required for the user communication device via said further base station may comprise at least one of: information relating to a data rate (e.g. non-GBR data rate) arriving at said further base station for the user communication device, an indication of a data loss associated with the user communication device at said further base station, and information identifying a buffer status for said user communication device.

The information relating to a data rate required for said user communication device via said further base station may comprise information relating to data packets transmitted over one or more non-guaranteed bit rate communication bearers associated with said user communication device.

The base station may be configured to operate as a master base station of said dual connectivity configuration and the further base station may be configured to operate as a secondary base station of said dual connectivity configuration.

The generating means (of the base station) may be operable to, when said information relating to a required data rate (via the further base station) is not available, generate an initial bit rate specific to the further base station, to be used in enforcement of a maximum data throughput over said at least one communication bearer via said further base station, based on the aggregate maximum bit rate specific to the user communication device. In this case, the providing means may be operable to provide the initial bit rate specific to said further base station to said further base station (e.g. prior to said obtaining means obtaining said information relating to a data rate required for the user communication device via said further base station).

The base station may further comprise means for controlling the establishment of said at least one communication bearer between the core network and the user communication device via said further base station; wherein said establishment of said at least one communication bearer may comprise providing, to said further base station, said initial bit rate specific to said further base station.

The providing means may be configured to provide, to said further base station, said information identifying said bit rate specific to said further base station over a base station to base station interface (e.g. an X2 interface).

The providing means (of the secondary base station) may be operable to provide said information to said master base station periodically and/or upon request by the master base station and/or upon detecting a predetermined trigger. The providing means may be operable to provide said information by sending at least one message to said master base station over a base station to base station interface.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop/tablet computers, web browsers, etc.

In the embodiments described above, the mobile telephone and the base stations will each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the base stations as a signal over a computer network, or on a recording medium. Further, the functionality performed by part or all of this software may be performed using one or more dedicated hardware circuits.

This invention has been described above by way of the embodiment, but this invention is not limited to the embodiment described above. Various changes that can be understood by a person skilled in the art can be made to the configuration and details of this invention within the scope of this invention. Various other modifications will be apparent to those skilled in the art and will not be described in further detail here.

This application is based upon and claims the benefit of priority from United Kingdom patent application No. 1414139.4, filed on Aug. 8, 2014, the disclosure of which is incorporated herein in its entirety by reference.

The invention claimed is:

1. A base station configured to operate as a master base station of a dual connectivity configuration in which a control-plane connection for a user equipment (UE) is provided via the master base station and at least one communication bearer between a core network and the UE is provided via at least one secondary base station, different to said master base station, said base station comprising:
   a memory storing instructions; and
   a processor configured to execute the instructions to:
   obtain information relating to a data rate for said UE via said secondary base station;
   generate information identifying a bit rate specific to said secondary base station, for use in enforcement of an aggregate maximum data throughput for said UE via said secondary base station, wherein said bit rate specific to said secondary base station is generated based on:
   an aggregate maximum bit rate (AMBR) specific to said UE; and
   said obtained information relating to the data rate for said UE via said secondary base station; and
   provide, to said secondary base station, said information identifying said bit rate specific to said secondary base station;
   wherein said information relating to the data rate for said UE via said secondary base station comprises at least one of: information relating to a data rate at said secondary base station for said UE relative to an AMBR applicable at said secondary base station for said UE, an indication of a data loss associated with said UE at said secondary base station, and information identifying a buffer status for said UE.

2. The base station according to claim 1, wherein the processor is further configured to obtain said information relating to a data rate for said UE via said secondary base station from the secondary base station, using X2 application protocol signalling.

3. The base station according to claim 2, wherein said X2 application protocol signalling comprises an AMBR status report from the secondary base station.

4. The base station according to claim 1, wherein said information relating to the data rate for said UE via said secondary base station comprises information relating to data packets transmitted over one or more non-guaranteed bit rate communication bearers associated with said UE.

5. The base station according to claim 1, wherein the processor is further configured to provide, to said secondary base station, said information identifying said bit rate specific to said secondary base station over a base station to base station interface.

6. A base station configured to operate as a secondary base station of a dual connectivity configuration in which a control-plane connection for a user equipment (UE) is provided via a master base station, different to said secondary base station, and at least one communication bearer between a core network and the UE is provided via said secondary base station, said base station comprising:
   a memory storing instructions; and
   a processor configured to execute the instructions to:
   determine a data rate for said UE via said secondary base station;
   provide, to said master base station, information relating to said determined data rate for said UE via said secondary base station; and
   receive, from said master base station, information identifying a bit rate specific to said secondary base station, wherein said bit rate specific to said secondary base station is based on: i) an aggregate maximum bit rate (AMBR) specific to said UE; and ii) said data rate for said UE via said secondary base station;
   wherein said information relating to said determined data rate for said UE via said secondary base station comprises at least one of: information relating to a data rate arriving at said secondary base station for said UE relative to an AMBR applicable at said secondary base station for said UE, an indication of a data loss associated with said UE at said secondary base station, and information identifying a buff er status for said UE.

7. The base station according to claim 6, wherein the processor is further configured to provide said information relating to said determined data rate to said master base station using X2 application protocol signalling.

8. The base station according to claim 7, wherein said X2 application protocol signalling comprises an AMBR status report.

9. The base station according to claim 6, wherein said information relating to said determined data rate comprises information relating to data packets transmitted over one or more non-guaranteed bit rate communication bearers associated with said UE.

10. The base station according to claim 6, wherein the processor is further configured to receive, from said master base station, said information identifying a bit rate specific to said secondary base station over a base station to base station interface.

11. A method performed by a base station configured to operate as a master base station of a dual connectivity configuration in which a control-plane connection for a user equipment (UE) is provided via the master base station and at least one communication bearer between a core network and the UE is provided via at least one secondary base station, different to said master base station, the method comprising:

obtaining information relating to a data rate for said UE via said secondary base station;

generating information identifying a bit rate specific to said secondary base station, for use in enforcement of an aggregate maximum data throughput for said UE via said secondary base station, wherein said bit rate specific to said secondary base station is generated based on: i) an aggregate maximum bit rate (AMBR) specific to said UE; and ii) said obtained information relating to the data rate for said UE via said secondary base station; and providing, to said secondary base station, said information identifying said bit rate specific to said secondary base station;

wherein said information relating to the data rate for said UE via said secondary base station comprises at least one of: information relating to a data rate at said secondary base station for said UE relative to an AMBR applicable at said secondary base station for said UE, an indication of a data loss associated with said UE at said secondary base station, and information identifying a buffer status for said UE.

12. A method performed by a base station configured to operate as a secondary base station of a dual connectivity configuration in which a control-plane connection for a user equipment (UE) is provided via a master base station, different to said secondary base station, and at least one communication bearer between a core network and the UE is provided via said secondary base station, the method comprising:

determining a data rate for said UE via said secondary base station;

providing, to said master base station, information relating to said determined data rate for said UE via said secondary base station; and receiving, from said master base station, information identifying a bit rate specific to said secondary base station, wherein said bit rate specific to said secondary base station is based on: i) an aggregate maximum bit rate (AMBR) specific to said UE; and ii) said data rate for said UE via said secondary base station;

wherein said information relating to said determined data rate for said UE via said secondary base station comprises at least one of: information relating to a data rate arriving at said secondary base station for said UE relative to an AMBR applicable at said secondary base station for said UE, an indication of a data loss associated with said UE at said secondary base station, and information identifying a buffer status for said UE.

\* \* \* \* \*